Oct. 4, 1938.  A. HOYT  2,131,737
GRAVIMETER
Filed Aug. 5, 1935  4 Sheets-Sheet 1

Inventor
A. Hoyt.

Oct. 4, 1938.  A. HOYT  2,131,737
GRAVIMETER
Filed Aug. 5, 1935  4 Sheets-Sheet 2

Oct. 4, 1938.  A. HOYT  2,131,737
GRAVIMETER
Filed Aug. 5, 1935   4 Sheets-Sheet 3

Inventor
A. Hoyt,
By A. M. Houghton
his Attorney

Oct. 4, 1938.     A. HOYT     2,131,737
GRAVIMETER
Filed Aug. 5, 1935     4 Sheets-Sheet 4

Inventor
A. Hoyt,

Patented Oct. 4, 1938

2,131,737

UNITED STATES PATENT OFFICE 2,131,737

GRAVIMETER

Archer Hoyt, Aspinwall, Pa., assignor to Gulf Research & Development Company, Pittsburgh, Pa., a corporation of Delaware Application August 5, 1935, Serial No. 34,824

16 Claims. (Cl. 265—1.4)

This invention relates to gravimeters, and particularly to gravimeters of the type employing a coiled spring and a loading weight therefor and adapted to measure directly the force of gravity at any point on the earth.

Among the objects of the invention are the provision of a portable, rugged gravimeter of high gravity sensitivity coupled with minimal seismic sensitivity and being suitable for accurate prospecting in the field and adapted to measure the force of gravity with a precision of at least one part in ten million; the provision of a gravimeter having a coiled ribbon spring, in which the minimum vertical cross-section of the ribbon is considerably greater in width than in thickness, whereby the sensitivity of the apparatus is enhanced and a direct angular deflection is given upon change in loading of the spring; the provision of a gravimeter of the spring balance type, giving a substantial angular deflection upon change in gravity and having optical means for amplifying this deflection; the provision of a spring balance type gravimeter giving angular deflection and having magnetic damping means for the weight, to control the deflection; the provision of means in a gravimeter of the type described for automatically compensating for temperature variations; and the provision of an improved optical device for amplifying angular deflections and particularly applicable to gravimeters.

These and other objects which will be apparent from a consideration of the following description are achieved by the gravimeter to be described.

One of the most direct methods of geophysical prospecting makes use of measurements of the force of gravity at different points on the earth's surface. A level, homogeneous terrain, or one of uniform stratification gives at the surface of the earth a constant value for the force of gravity, of a certain definite value. However, changes in elevation, and inhomogeneities of sub-surface structure underlying a level plain, are associated with differences in the force of gravity at the surface. For example, a submerged intrusion of massive rock in a terrain of light material such as sandstone, produces in the region overlying it a gravitational anomaly: the force of gravity is slightly greater over the massive intrusion than elsewhere on the plain. It is an object of geophysical prospecting methods which depend upon gravity, to measure differences in the force of gravity between various points on the surface of the earth.

The method which has found widest use utilizes the torsion balance. This instrument measures not directly the force of gravity at a given point but instead the horizontal rate of variation of the force. It also measures a quantity proportional to the differential curvature of the level surface at a given point. But it does not measure the force of gravity itself; which is the parameter of primary interest. In using such instrument, the values obtained at a group of stations (points on the surface of the earth where an observation is made) represent rates of change of gravity at the stations. In order to find the difference in the force of gravity between two given points with this instrument, it is necessary to make measurements between the two points and from them build up a function or curve from which by integration, the actual difference in gravity can be calculated between the two points. The precision of the calculated value for the gravity difference between the two given points increases with the number of intervening observation points. But the number of intervening observations which can be made in practice is necessarily rather small.

Thus while the sensitivity of the torsion balance is extremely high, as regards the parameter it is adapted to measure, the precision of force of gravity measurements made with it is by no means so high.

Accordingly, it has been a desideratum in the gravitational prospecting art to improve upon the torsion balance method; to measure the force of gravity directly. For practical reasons no other method than the torsion balance method has found wide applicability. Two ways of measuring gravity directly are the pendulum method and the spring balance method. The pendulum method involves determining the frequency or period of a pendulum at a given point. It is theoretically capable of high precision. But the long time necessary for each observation has militated against its general use.

The other method makes use of a hanging spring loaded by a mass. The extension of the spring as the weight of the mass changes due to differences in gravity is measured and taken as a measure of the difference in gravity. Instruments of this type are similar in principle to vertical seismographs. A vertical seismograph is essentially a vertical accelerometer, adapted to measure vertical accelerations due to vibration of the earth's crust during earth shocks. Gravimeters based on the same principle measure vertical acceleration of gravity. However, properly designed gravimeters differ from seismometers in that the seismographic or dynamic efficiency of the instrument is purposely made low while its sensitivity to gravity, that is, its steady state deflections under varying gravitational force, are or should be made as large as possible.

Instruments built on the spring and weight principle have been operated experimentally in the laboratory where large size, great weight and extreme delicacy are not important limitations. But no apparatus of this type has hitherto been developed which is at once sufficiently sensitive and sufficiently rugged for routine field operations. Instruments are worthless for routine prospecting unless they are capable of consistently measuring gravity differences of the order of one part in ten million, and at the same time are rugged enough to be transported over rough country and set up and adjusted in a short time by relatively unskilled operators.

According to the present invention there is provided a gravimeter of the spring and weight type in which the seismic efficiency is minimized and in which are met the stringent conditions of accuracy, dependability and ruggedness required for a field instrument.

The invention represents a combination of elements, many novel per se, which cooperate to produce an instrument having the required qualifications. The instrument comprises primarily a coil spring formed of a member of metal or of other suitable elastic material, coiled into a helix or spiral; the member having in cross section a greater width in the direction of the axis of the helix than thickness perpendicular to such axis. In the simplest embodiment the spring takes the form of a coiled ribbon of metal. This spring is suspended at one end from a fixed support and the other end hangs free and carries a weight. The fixed end is attached to the support through a flexible or adjustable hanger which allows the spring and weight to freely assume vertical position and thus reduce the level sensitivity of the device. The described spring upon loading by the weight gives a measurable angular deflection. It is thus distinguished from ordinary coil springs which give a quite negligible angular deflection on extension. The end of the spring which carries the weight is freely suspended, there being no mechanical connections at this end. The indication of the angular deflection is made through a novel optical system cooperating with the weight and spring assembly but imposing no mechanical resistance or strains upon them. The angular deflection of the spring is amplified directly by optical means to give an angular deflection which is readily observable. The combination described, together with other elements to be explained in detail, results in a gravimeter which is capable of measuring the force of gravity with a precision of at least one part in ten million. Moreover the instrument is so rugged that it can be used under the strenuous conditions of field work without changing its constants or losing accuracy. It has a sensitivity comparable with that of the torsion balance and at the same time has the great advantage over the torsion balance in that it measures directly differences in the force of gravity which simplifies prospecting from every point of view.

In the accompanying drawings there are shown more or less diagrammatically several examples of specific embodiments of apparatus within the scope of the invention.

The gravimeter as a whole

Figure 1:
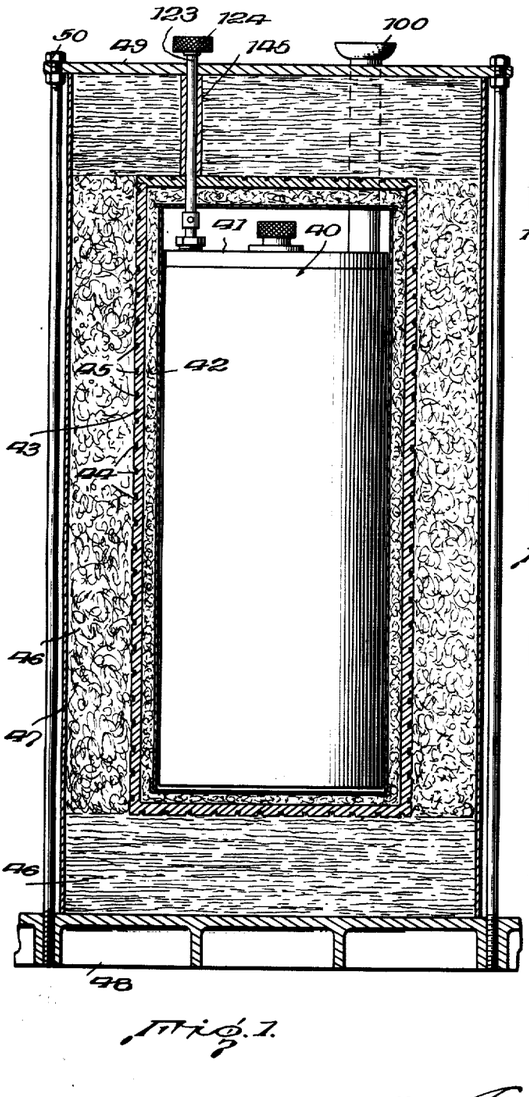
Fig. 1 is a view of the gravimeter showing the heat insulating jacket in vertical section.

In the drawings, in the several views of which like reference characters indicate like parts, Fig. 1 is a simplified diagrammatic view of a gravimeter in housing. The instrument comprises an enclosed metal casing 40, provided with a top plate 41. The working parts of the gravimeter (to be described) are located inside the casing. Closely surrounding the casing is a layer 42 of heat insulating material, surrounded by a shell 43 having grooves 44 in which are run heating wires 45 for maintaining the shell at a desired constant temperature. The shell is in turn surrounded by a thick jacket 46 of heat insulating material, and the assemblage described is fitted inside a metal housing 47, provided with a base 48 and a top plate 49. Tie bolts 50 connect the base and the top.

Figure 2:
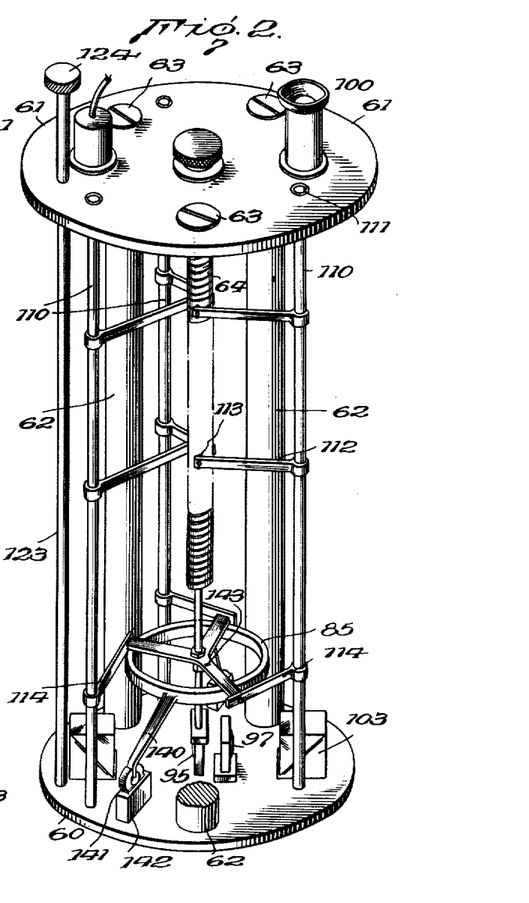
Fig. 2 is an isometric view of the essential working parts of a gravimeter made in accordance with the invention, the casing being omitted for simplicity of illustration.
Figure 5:
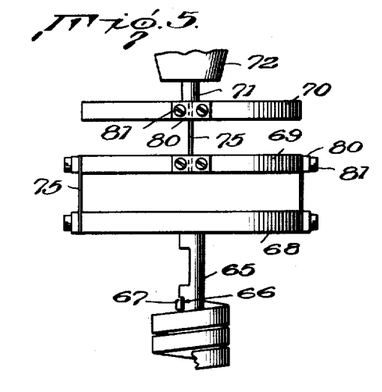
Fig. 5 is a view in elevation of the gimbal hanger.

Fig. 2 is a diagrammatic view to illustrate the general assembly of working parts as clearly as possible. The gravimeter assembly proper is shown as comprising a base plate 60 and a top plate 61 which are joined into a rigid assembly by three rigid upright columns 62, fastened to the base and top plates by screws 63. An essential part of the improved gravimeter is a coil spring 64. As explained in more detail post, this spring is in the form of a helix, usually of a metal band or ribbon wound into the required form. The thickness of the band composing the helix is much less than the width. The coil spring furthermore is advantageously of considerable length in comparison to diameter. In general, other things being equal, the longer the spring the more sensitive is the instrument. This spring is attached at the upper end to the top plate. The attaching means, which is shown in Fig. 5, comprises a post 65 having a flat portion 66 to which one end of the spring is secured by means of a screw 67. The post is provided with a disk 68 fixed thereto. Above the cross bar is disposed a disk shaped member 69 and above this member a support 70 attached through a post 71 to a revolvable conical-seated member 72. Member 72 is seated in a conical orifice 73 in the top plate and is provided with a knurled knob 74 (Fig. 3) for angular adjustment. In practice, suitable micro-adjustment means of the tangent screw type are provided for the plug, these being omitted from the figures for the sake of clarity and simplicity of showing. Members 68 and 69 are joined by flexible filaments 75, which may be metal or quartz wires of round or substantially round cross section or narrow, thin metal tapes. Similar filaments connect members 69 and 70. The filaments are attached to the peripheries of these members by clamping blocks 80 and screws 81.

Figures 13, 14, 15, 16, 17:
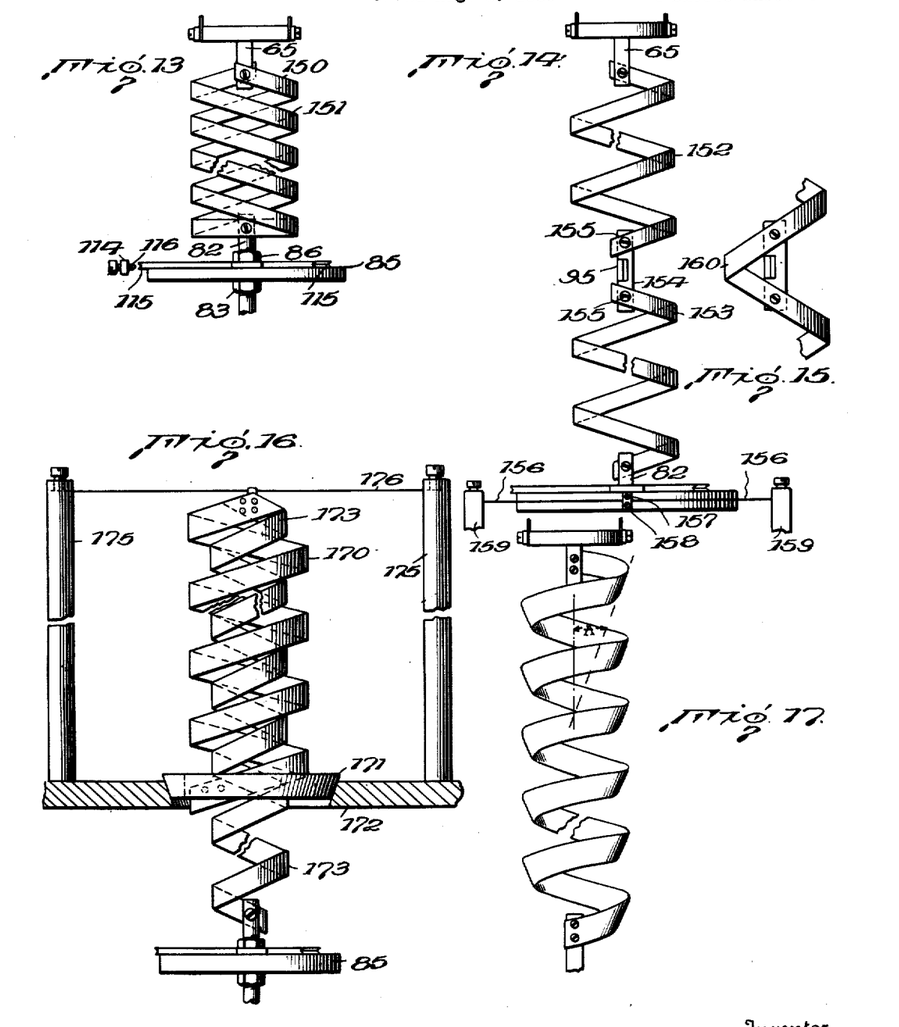
Fig. 13 is a diagrammatic view of a double spring and weight assembly.
Fig. 14 is a diagrammatic view of a modified spring and weight assembly, with the indicating means in the middle.
Fig. 15 is a view of a modification of the device of Fig. 14.
Fig. 16 is a view of a modification in which one section of the spring is under compression and the other under tension.
Fig. 17 is a view of another spring modification.

The lower end of the spring is fitted with a post 82 attached to the spring in a manner similar to the upper post. The post is provided with a collar 83 which carries a spider 84, shown as having three arms, which in turn carry a narrow-rimmed annular weight 85, concentric with the axis of the helix. The spider is firmly retained to the post by a nut 86 on post 82 (Fig. 13). The spring and weight combination hangs freely from the upper hanger. In operation, there is no mechanical attachment to the weight and spring combination except the hanger. The weight of the annulus 85 changes in accordance with the force of gravity at the point on the earth where the apparatus is set up. This change in weight produces a greater or less pull on the spring, as the case may be, and this is reflected as will be explained, in an angular deflection, i. e., rotation, of the lower end of the spring and of the weight.

Figure 3:
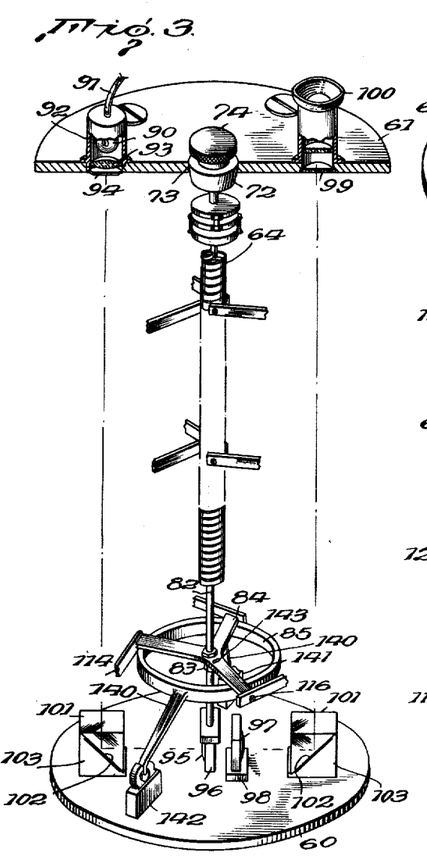
Fig. 3 is a similar view showing the optical system in more detail.

The optical system whereby this angular deflection is observed is shown diagrammatically in Fig. 3. It comprises a source of light shown as a concentrated tungsten filament bulb 90 supplied with current through wires 91 and mounted in a case 92 upon the top plate. A convex lens 93 is mounted in such manner that the filament of the lamp is at one conjugate focus of the lens. A member having an adjustable slit 94 is mounted on top plate close to the lens, as shown. The lower portion of post 82 carries a plano-convex lens 95 in a suitable mount 96. A similar lens 97 in a stationary mount 98 is fixed to the base plate. A scale 99 is provided in the top plate. This may be a piece of glass with suitable graduations marked or engraved thereon. The lens combination 95 and 97 forms an image of slit 94 on the scale. An adjustable ocular 100 permits the eye to focus simultaneously upon the scale and the slit image. On the base plate are mounted two totally reflecting 45 degree prisms 101 having reflecting hypotenuse faces 102 and mounted on suitable mounts 103. The function of these prisms is to change the direction of the beam from the light and lens combination, twice, so as to direct it finally upwards towards the eye piece and scale.

When moving the instrument it is essential to have some clamping means. The spring and weight should not be left freely hanging except during the time observations are being made. The clamping means is shown in detail in Figs. 2 and 4. As shown, three vertical rods 110 are provided, journaled as at 111 in the base plate and top plate. Each rod carries two radial arms 112 extending adjacent the spring. The end of each arm adjacent the spring has a small buffer member 113. Each rod also has a radial arm 114 opposed to the ends of spider 84. The ends of the spider arms 84 are grooved as at 115 (Fig. 13) and radial arms 114 are provided with small conical-pointed screws 116 adapted to engage and clamp the spider arms in grooves 115. Figs. 2 and 3 show these arms in the engaged position, the position they take when the apparatus is not in use.

Figure 4:
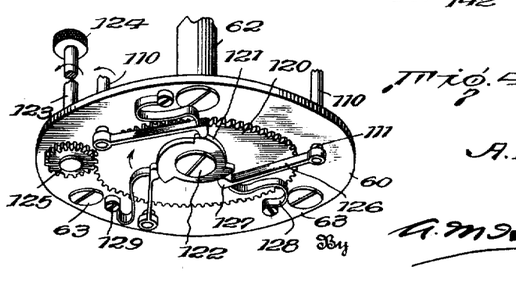
Fig. 4 is an isometric view of the under side of the base of the apparatus of Figs. 1 and 2.

The arrangement for engaging and disengaging the arms from the spring and weight is shown in Fig. 4, which is a view of the bottom of the apparatus of Fig. 2, looking upwardly. As shown, a large gear 120 is provided, having a triple cam 121 fixed thereto, the gear and cam assembly being pivotally mounted on the base plate by a screw 122. There is provided an adjusting rod 123 extending from below the bottom plate up through the top plate and outside the apparatus (note Fig. 1), the upper end of the rod being provided with a knurled adjusting knob 124. The lower end of adjusting rod 123 has a pinion 125 adapted to drive gear 120. The lower end of each rod 110 has a radial arm 126, the outer end of which has a rounded knob 127 engaging the cam. These radial arms are held against the cam by springs 128, which are attached to the base plate by screws 129.

The operation of the clamping device is apparent from Fig. 4. Upon turning knob 124 in the direction of the arrow, cam 121 is rotated in the opposite direction, which turns rods 110 in the same direction as knob 124. This tends to clamp the weight and bring the buffers (113) close to the spring. The points 116 on arms 114 actually engage the spider and solidly clamp it. However, the buffers on arms 112 do not actually touch the spring. They are adjusted to come very close to it, so as to prevent excessive lateral vibration. But actual contact is avoided, because even a slight distortion of the spring is enough to interfere with the accuracy.

The freely suspended weight and spring system described is extremely sensitive. This makes it liable to disturbance by slight mechanical shocks, vibration of the instrument by wind, minor earthquakes and microseismic tremors, etc. These tend to set the system into prolonged oscillations, making observations difficult. In order to minimize the effect of seismic tremors the weight is purposely designed to have a large amount of inertia. It is made in the form of a narrow annulus having as large a radius as can conveniently be provided, so as to distribute the mass of the weight far from the axis of rotation of the spring. The weight thus acts like a flywheel stabilizer and greatly reduces spurious angular deflections due to vertical components of seismic tremors and to other causes, such as jars occurring during the operation of the various control mechanisms. The seismic sensitivity or, so to speak, the seismic efficiency, is reduced to a minimum.

There are also several sources of disturbance which introduce only horizontal disturbing components of motion to the weight. Spurious deflections from these causes are reduced to a minimum by the provision of the special optical system described, wherein the moving mirror face is always parallel to the axis of the spring and the slit image is also (in effect) parallel to the axis. The optical system is very insensitive to horizontal seismic disturbances; and incidentally to vertical disturbances as well.

In spite of these precautions there is some tendency—due partly to the extremely high sensitivity of the apparatus—for occurrence of prolonged residual oscillation. To overcome this tendency I provide suitable damping means. It is possible to obtain a damping effect by conventional arrangements, for example, by providing a thin vane attached to the weight and operating in a confined space, the damping effect here being due to viscosity of the air which absorbs the rotational energy of the system. However, I have devised a better damping means, based on magnetic principles.

As shown, in Figs. 2 and 3, the annular weight 85 is provided with diametrically opposed radial arms 140. Two are shown (Figs. 2 and 3), but any number may be used, so long as the arms are grouped approximately symmetrically about the axis of the weight. Two permanent horseshoe magnets 141 are fixed to the base plate by suitable supports 142. The outer ends of arms 140 extend into the gap of magnets 141 without touching the magnets. Arms 140 are made of non-magnetic material such as brass or aluminum. The damping effect depends on electromagnetic principles. As the ends of arms 140 swing through the magnetic gaps, currents are induced in the arm ends, and an electromagnetic damping force tending to restrain motion of the arms is set up as the arms move through the field of the magnets. Since it is usually expedient to make the coil spring of magnetic material, the magnets should be placed as far as possible from the spring and accordingly arms 140 are advantageously long and are downwardly directed, as shown in Figs. 2 and 3. Since the coil spring is usually constructed of magnetic material it inevitably becomes magnetized to some extent. The presence of permanent magnetic moments in the spring itself in combination with the earth's magnetic field produces a torque tending to rotate the spring system and causing spurious scale deflections. The magnitude of these deflections varies; it depends upon the orientation of the instrument with respect to the earth's magnetic field and also upon the strength of the earth's field and of the magnetic moment of the spring. I have found it possible to minimize or substantially eliminate these magnetic disturbances by attaching at a suitable position upon the weight a small, permanent magnet whose magnetic moment is exactly equal to that of the spring and is displaced or oriented 180 degrees with respect thereto. This compensating magnet, 143, is shown fixed to the spider 84. In practice, this magnet is moved around until compensation is secured and then is fixed in place by cement.

The assemblage shown is mounted in an airtight casing, as shown in Fig. 1. All adjusting rods, screws, etc., are brought through packing glands, as for example gland 145 surrounding shaft 123 (Fig. 1).

The spring

Considering the spring in detail: in an ordinary coil spring, such as one made up from round wire, there is substantially no angular distortion of the spring upon change in length. There is a very slight deflection, but so small as ordinarily to escape detection. The deflection may be either sense, depending on internal stresses, etc., in the spring. However, if the spring is made up, not of round wire, but of a flat or approximately flat ribbon, the spring has quite different characteristics. Upon extension by change in loading there is a relatively strong angular deflection, always in the same direction. I have found that the magnitude of the angular deflection, other things being equal, depends directly on the ratio of the width of the band composing the spring, to the thickness of the band. In the gravimeter, the thinner the band the greater the sensitivity. I find that springs made from ribbons in which the ratios of ribbon width to ribbon thickness are from 10 to 1 to 100 to 1 are useful. The ratio is best made as great as practical considerations will permit.

The theory underlying the action of the spring is complicated, and has not been completely worked out mathematically. The reason for this is that the ribbon spring is in effect a warped plate; a structure of complex dynamics. The ribbon has different radii of curvature in different cross sections. The radius becomes infinite (that is, gives a parallelogram rather than a curved cross section) only in a plane parallel to the central axis of the helix. The restoring force is in effect a rotational rather than a straight line force. However, it is a fact that the helix obeys Hooke's law quite accurately over the useful range. The deflections are linear, which is sufficient for my purposes.

Figure 18:
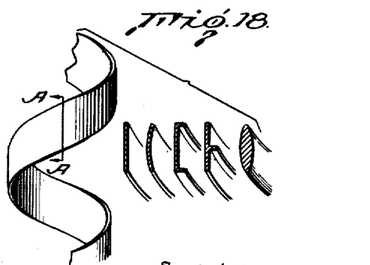
Fig. 18 is a view in vertical section of several modifications of helices.

While in general the most convenient form of spring is one made by winding a flat tape or ribbon into a helix, which as stated gives a helix having a parallelogram cross section in a plane parallel to the axis of the helix, helices of other cross sections are useful in certain relations. Fig. 18 shows a portion of a helix and five different helix cross sections (taken along line A—A of the helix), these being parallelogram, crescent-shaped, channeled, T-shaped and oval respectively. In general, helices with crescent or channeled cross sections are stiffer than flat tape or oval helices, the other characteristics remaining substantially unchanged.

Another helix modification is shown in Fig. 17. Here the longitudinal axis of a cross section of the ribbon is not vertical but is inclined at an angle A with respect to the vertical axis.

The simplest and, on the whole, the most useful way of utilizing the principle of the ribbon spring is that shown in Fig. 2. However, other arrangements have advantages in certain relations. Figs. 13, 14, 15 and 16 show optional arrangements. Referring to Fig. 13, this shows a spring system comprising two substantially identical helices 150 and 151 fastened at top and bottom to hanger post 65 and weight post 82. The helices are both in the same direction; e. g., both are left hand. They are attached in phase difference, so to speak. In the case of two springs, as illustrated, they are attached 180° apart. Three or more helices can be mounted in this way. In general, these multiple helix arrangements are somewhat less disturbed by their supporting hanger being slightly off level, than is a single helix. On the other hand, they are somewhat stiffer. They can be wound from a single piece of ribbon.

Fig. 14 shows another arrangement utilizing two similar helices 152 and 153 wound in opposite directions; that is, one is right hand and the other is left hand. The upper end of helix 152 is attached to post 65 and the lower end of helix 153 is attached to post 82. In this modification the indicating means is in the central portion of the spring combination. As shown, lens 95 in a mount 154 is attached to the lower end of spring 152 and the upper end of spring 153 as by screws 155. The weight moves up and down without rotation while the lens rotates. In this modification the weight is restrained from rotation by providing a pair of thin, flexible, tangential filaments 156 each attached to the weight as by clamp blocks 157 and screws 158 and attached to fixed supports 159. Only one filament 156, and one pair of supports 159, appear in Fig. 14, the others being on the opposite side, diametrically opposed.

This spring modification may be constructed from a single ribbon, as shown in Fig. 15, the spring being doubled back sharply on itself as at 160.

This type of spring can be utilized in other arrangements. For example, both ends of the spring can be rigidly fixed and the weight can be attached at or adjacent the lens mount, near the center of the spring system.

Fig. 16 shows an arrangement employing a spring doubled back upon itself. As shown, a large diameter helix 170 is mounted on an annular, conical, angularly adjustable mount 171 journaled in a fixed support 172. The upper end of spring 170 is attached to the upper end of a smaller diameter spring 173, which is wound in the same direction as spring 170 and which is suspended from spring 170 inside thereof. The lower end of spring 173 is attached to a weight 85 as in the apparatus of Fig. 2. This modification has the advantage of high compactness. The angular deflection for a given overall length is higher than in the case of the simple spring. It is advantageous to give lateral support to the upper ends of the springs to prevent side-sway. This is accomplished by providing at least three or more supporting members 175 and filaments or tapes 176 connecting the upper end of spring 170 thereto. Two such members are shown in Fig. 16.

Figure 8:
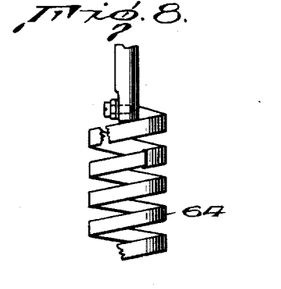
Fig. 8 is a view of a portion of a spring provided with temperature compensating means.

The spring is advantageously made of material having a low temperature coefficient of elastic modulii. The sensitivity of the instrument is so great that changes in length of the spring with temperature are apt to introduce an error unless the temperature of the working parts is held constant within narrow limits or else the effect of temperature changes is compensated in some other way. I have found that the requirements for constancy of temperature are much less severe if temperature compensating means are included in the spring itself. This is conveniently done as shown in Fig. 8, by providing somewhere in the spring a bimetallic section of metals having different coefficients of expansion; e. g., brass and invar. The section is adjusted in length such that rotation in one direction due to temperature variations acting on the bimetallic section is exactly compensated by the tendency on the part of the spring proper under influence of temperature changes to rotate in the opposite direction. Ordinarily a fraction of a turn up to one or two turns of bimetallic helix are sufficient for this purpose. One of the metals can be, and advantageously is, that of the spring itself; that is, the bimetallic section is made by covering a sufficient number of turns of the spring with a layer of a different metal. The extra metal layer may be inside or outside the spring, depending on the expansion coefficient of the metal compared to that of the spring and the sense of the compensating rotation required, and can be riveted, soldered, welded, plated or otherwise attached.

Figure 9:
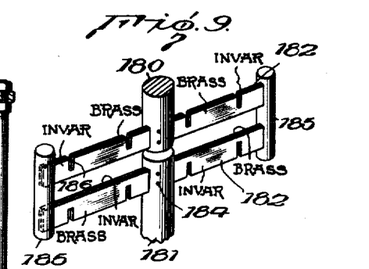
Figs. 9, 10 and 11 are views of spring supports in which temperature compensating means are incorporated.
Figure 10:
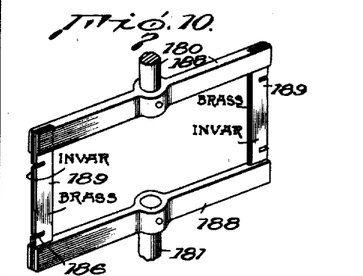
Figure 11:
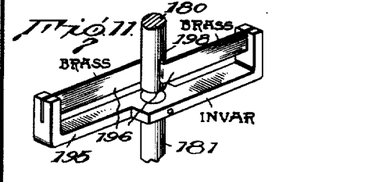

Instead of using a bimetallic helix section as described, other temperature compensating means utilizing differential thermal expansion can be utilized. Optional ways of providing temperature compensation are illustrated in Figs. 9 to 11. Referring to Fig. 9, post 65 is divided into two sections: upper section 180 and lower section 181. To each section are attached two similar compound bars 182, formed of strips of suitable dissimilar metals, e. g., brass and invar, fastened together as by soldering. One end of each strip is attached to the section as by rivets 184, while the opposite ends of the strips are fastened solidly together by clamping members 185. The brass and invar portions of the strips are disposed as shown. With this arrangement, temperature changes produce a torque tending to rotate section 181 with respect to section 180. Temperature compensation is thus secured. Variation of the compensating effect can be accomplished by varying the length of the strip, or by forming slots 186 in the strips as shown. The depth of the slots cut in the strips determines the compensating effect. By deepening the outer slots with respect to the inner slots, the angular deflection for a given temperature change is increased, whereas if the outer and inner slots are of equal depth, the angular deflection is minimized.

Fig. 10 shows an alternative arrangement. Upper section 180 and lower section 181 are provided with monometallic arms 188, as shown. The arms are joined by strips 189 of dissimilar metals similar to those shown in Fig. 9. By deepening the upper slots with respect to the lower slots, angular deflection is increased.

Fig. 11 shows an arrangement wherein the lower section 181 carries a U-shaped member 195 of invar, for example, joined to section 180 with brass strips 196, fastened to upper section 180 by means of grooves 198 in the manner indicated, to form a sort of hinge joint.

These compensating means have the advantage that very exact temperature compensation may be provided in the assembled instrument under operation conditions.

Figure 12:
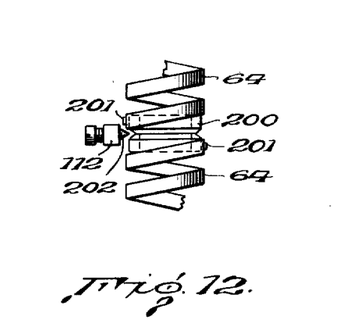
Fig. 12 is a view of a portion of a spring, showing an arrangement whereby the spring may be clamped against movement.

As stated, in the arrangement of Figs. 2 and 3 the buffers on arms 112 cannot be allowed to engage the spring. Even a slight pressure might introduce a deformation sufficient to introduce error. In Fig. 12, I have shown a modification which allows the spring to be solidly clamped. The spring, which may be one of any of the types described, is divided at one or more places along its length and a grooved solid disk or annulus 200 is inserted, joining the two spring sections. The sections are attached to the annulus by screws 201. In this modification the ends of arms 112 are provided with adjustable pointed tips 202 adapted when the arms are moved inwardly to engage and solidly clamp the annulus by the groove therein. This arrangement provides an exceptionally rugged gravimeter, which is not damaged or thrown out of adjustment by hard usage. The spring is solidly supported not only against lateral vibration but also against longitudinal vibration. This segmented spring construction is the equivalent in precision and operating characteristics, of the simple spring of Fig. 2.

*The optical system*

Figures 6, 7:
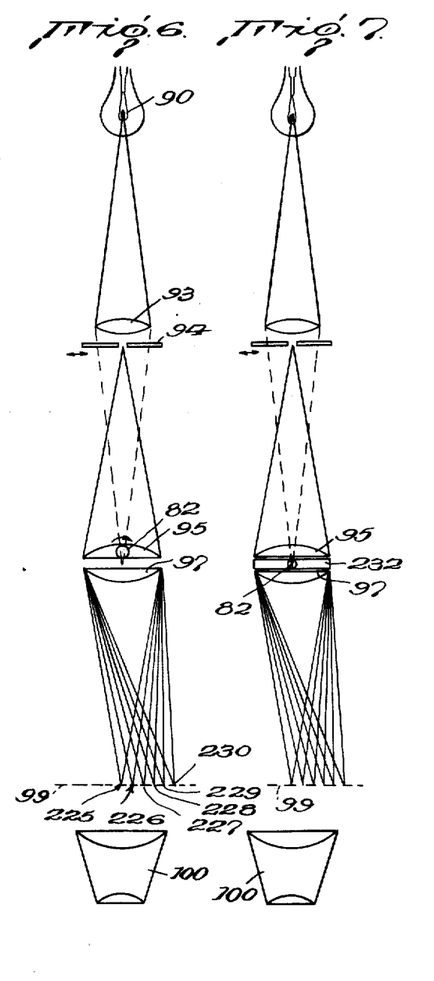
Figs. 6 and 7 are diagrammatic views illustrating two modifications of the optical system.

Figs. 6 and 7 show diagrammatically two modifications of the optical system, the parts being indicated in conventional manner. In each case the reflecting prisms 101 are omitted for the sake of clarity of showing. Their only function is to change the direction of the beam. Referring to Fig. 6, the source of light 90 is shown as at one focus of lens 93 and is imaged about at the center of the lens combination 95, 97; this adjustment not requiring especially high precision. Adjustable slit 94 extending in a direction perpendicular to the plane of the diagram restricts the beam from lens 93. The slit and scale 99 are at conjugate foci of the lens combination 95, 97 and advantageously are at or near the principal foci of these lenses so that the beam in the region between the two lenses is parallel or substantially so. The plane faces of lenses 95 and 97 are partially silvered or otherwise provided with a partially reflecting, partially transmitting layer so that the transmission is about 10 per cent. One especially good way to form the partially reflecting layers is to provide an aluminum coating on the glass by evaporative methods known per se. Such coatings are highly reflective and do not tarnish. When the lenses 95 and 97 are parallel, which is the normal or zero position, a single image of the slit is formed at the scale as at 225. Upon slight rotation of lens 95 there appears at the scale a series of approximately equally displaced images of the slits as at 226, 227, 228, 229 and 230. Four reflected images in addition to the direct beam are shown but in practice it is readily possible to observe the images as high as the 12th or 14th reflection. By optical lever effect the angular deflection of each reflected ray (including those inter-reflected between the silvered lens faces) is twice the angular deflection of the moving lens. The high order multiple reflections give considerable amplification. The 12th reflection gives a magnification of 24 times. The deflection of lens 95 is in all cases small and even the high order of deflections observable at the scale are not very far from the axis. Accordingly the observed deflections are for all practical purposes linearly proportional to angular deflection of the lens. In case it is desired to measure angular deflections of greater magnitude the scale 99 can be curved or a tangent correction can be introduced in other ways.

If it is desired to always work with a reflected image of a certain order, say the $n$th, it is advantageous to adjust the transmission factor of the reflecting layer on the lenses to get the maximum intensity in the particular order of reflection selected. This is done by adjusting the transmission factor T to equal $1/(n+1)$. Thus for example if one works with the 12th order reflection T=1/13=7.7 per cent.

While it is possible to obtain magnified indications of mechanical displacement by other optical means, such as interferometer arrangements utilizing interference fringes, it is usually very difficult, and is sometimes impossible, to utilize them. This is because of the impossibility of ascertaining at the time of observation the order of reflection used as a reference. With the optical arrangement shown, the operator sees at a glance the undeviated ray and all the multiple reflections and therefore can immediately determine whether readings are made on the 8th, 10th or other order of reflection and hence determine the amplification factor to be applied to the scale readings. Moreover the simultaneous presence of the undeviated ray permits its use as a zero reference. Accidental minute displacements of the scale and eye piece with respect to the axis of the optical system, as by a shock or jar, are instantly detected and suitable corrections can be applied to the scale reading.

This optical system is easily capable of measuring angular displacements of the order of 0.1 or 0.2 second of arc. It is well adapted for measurement in general of small angular deflections; the advantages described accrue.

In practice, scale 99 and the eyepiece (100) are in the form of a filar micrometer. Slit 94 is provided with adjustable jaws.

Fig. 7 shows a modified optical system which funtions similarly to that of Fig. 6. In this case the two lenses 95 and 97 are fixed, as to the base plate, and there is provided between them a plain parallel plate of glass 232, closely adjacent the plane faces of the lens. One face of plate 232 and the adjacent plane face of one of the lenses are lightly silvered. Plate 232 is suspended from post 82, so as to rotate about an axis perpendicular to the optical axis of the lens. On twisting of the plate multiple reflected images of the slit are produced at the scale.

In each of these systems satisfactory results can be obtained even if the reflecting faces of the lenses (or plate) are not silvered but the higher order reflections are brighter if the faces are silvered as described.

While these optical systems are particularly useful in my gravimeter, other indicating means which do not put any strain whatever upon the suspended system can be employed.

The optical systems per se are disclosed and claimed in my copending application Serial No. 71,737, filed March 30, 1936.

It will be observed that in all these modifications the weight and spring are suspended freely from a flexible hanger at the top. There is no mechanical connection or any other hindrance imposed upon the spring and weight combination; nothing which tends to introduce spurious torques or restoring forces. This has many advantages. It makes for a much more sensitive and accurate instrument and in addition makes the gravimeter much less sensitive to inclinations from level. That is, the gravimeter need not be leveled so precisely as might be expected. The weight and spring assembly acts as a plumb-bob and seeks the vertical unhampered.

In using the instrument it is set up and leveled by known methods, the leveling not requiring excessive precision. It is then brought to a standard temperature by a thermostatic control, not shown. The spring and weight are unclamped by a simple turn of the screw. The (gravitational) force tending to distort the spring and give rise to angular deflections is $Mg$ where $M$ is the total effective mass associated with the spring and $g$ is the acceleration due to gravity at the place where the instrument is set up. Under this force the spring and weight assembly assumes an equilibrium position wherein the restoring force of the spring is equal to the gravitational force. This position corresponds to a particular deflection produced by the optical system on the scale. Deflections are read at the eyepiece and recorded. When observation is completed the spring and weight are reclamped. Drift of the spring, when excessive, is periodically checked by comparison observations made at a standard reference point on the earth and is compensated for by adjusting spring support 72 angularly. Upon moving the instrument to a place having a different value for $g$, the deflection at the scale is different. To bring the scale indications within range of measurement under widely different values of gravity as in moving from one locality to another involving changes in gravity exceeding say one part in ten thousand, it is only necessary to rotate the spring supporting mount. The scale constant remains unchanged.

Upon loading a typical instrument made under the invention, with a weight of 1 gram, (representing an increase in loading of the spring of 1 per cent), the angular deflection was of great magnitude: 30 degrees. This illustrates the remarkable sensitiveness of the apparatus. The angular deflection of the weight corresponding to a change of gravity of 1 part in 10,000,000 is of the order of 1 second of arc. This corresponds to about 20 scale divisions, when reading the 10th multiple reflection.

The apparatus has been found to be capable under field conditions of a precision within 1 part in $10^7$. It is not thrown out of adjustment or injured by rough treatment such as transportation in trucks over rough ground.

What I claim is:

1. A gravimeter giving a direct angular deflection and comprising a coil spring suspended at one end and formed of a coiled metal band of w'dth much greater than thickness, so that when the length of the coil spring is changed the unfixed end of the spring rotates, and a weight associated with the unfixed end of the spring and adapted to change the length of the spring under influence of gravity.

2. A gravimeter comprising a helical spring suspended at one end and formed of a coiled metal band of width much greater than thickness, so that when the length of the helix is changed the unfixed end of the helix rotates, an annular weight associated with the unfixed end of the helix and adapted to change the length of the helix under influence of gravity, the annular weight being so constructed and arranged that the mass thereof is distributed remote from the helix axis so as to act as a flywheel stabilizer for the helix, and indicating means associated with the weight and spring combination for giving a magnified indication of the angular deflection, the indicating means being of a type which imposes no frictional resistance upon the weight or spring.

3. A gravimeter giving directly an angular deflection and comprising a double helical spring fixed at one end and formed of two coiled metal bands of thickness much less than width and wound in the same direction, so that when the length of the double helix is changed the unfixed end of the helix tends to rotate, a weight mounted so as to change the length of the double helix under influence of gravity and indicating means associated with the weight for giving a magnified indication of the angular deflection.

4. A gravimeter comprising a helical spring fixed at one end, a second helical spring attached at one end to the unfixed end of the first spring, the two springs being wound in the same direction, the thickness of the band of each spring being much less than the width, a weight attached to the other end of the second spring and adapted to compress one helix and extend the other under influence of gravity, so that variations in gravity are reflected as angular deflections of the end of the second helix, and indicating means associated with the spring and weight assembly for giving a magnified indication of the angular deflection.

5. In the apparatus of claim 1, magnetic damping means for the weight comprising fixed magnets opposed to the weight to damp out residual spurious oscillations of the weight and a compensating magnet mounted on the weight to neutralize the slight residual magnetism of the spring.

6. A portable gravimeter comprising a substantially air-tight container, a helical spring formed of a coiled metal band of width much greater than thickness, so that upon change of length the unfixed end of the helix tends to rotate, means for suspending the spring near one end of the casing, a weight in the casing and associated with the spring and adapted to change the length of the spring under influence of gravity, the suspending means for the spring allowing it and the weight to freely assume a vertical position, and indicating means in the casing associated with the weight and spring assembly for giving a magnified indication of the angular deflection.

7. In a gravimeter of the spring balance type, the improvement comprising a coil spring in at least two separate sections, at least one clampable member fixed to adjacent ends of said sections, at least one pair of movable arms opposed to said member and means adapted in one position to cause the arms to engage and solidly clamp said member and thereby restrain it and the spring against vibration.

8. A gravimeter having a ribbon coil spring and a loading weight suspended thereon whereby change in the force of gravity causes angular deflection of the weight, and a compensating magnet in fixed relation to the weight to neutralize magnetism of the spring.

9. In a gravimeter having a ribbon coil spring adapted to yield a direct angular deflection upon being loaded and a loading weight therefor, damping means for the weight and spring comprising depending arms of non-magnetic metal on the weight and symmetrically disposed about the axis of the spring and weight and fixed magnets closely opposed to said arms and affording magnetic damping.

10. A gravimeter having a ribbon coil spring and a loading weight therefor and temperature compensating means for the spring comprising a bimetallic section in the spring, adapted to introduce an angular rotation proportional to the temperature coefficient of the spring.

11. A gravimeter giving a direct angular deflection and comprising a mounted coil spring formed of a coiled metal band of width much greater than thickness, whereby upon distortion of the spring a portion of the spring rotates, and a weight attached to the spring and adapted to distort it under influence of gravity.

12. A gravimeter comprising a vertically arranged coil spring formed of a wound-up ribbon of thickness much less than width, a mass suspended on the spring so that upon change of weight of the mass the spring tends to rotate, and a flexible frictionless hanger for the spring allowing it to freely asume a vertical position under influence of the weight, while preventing angular twisting of the end of the spring adjacent the hanger, whereby the level sensitivity of the gravimeter is materially reduced and spurious distortional effects due to tilt of the suport are minimized.

13. A gravimeter comprising a vertically arranged coil spring formed of a wound-up ribbon of thickness much less than width, a mass suspended on the spring so that upon change of weight of the mass the spring tends to rotate, a fixed support, and a gimbal hanger for the spring having a member attached to the spring and four spaced flexible filaments connecting said member with the fixed support and so constructed and arranged as to allow the spring and weight to freely assume vertical position in spite of tilt of the support, while opposing twisting of the upper part of the spring with respect to the support, so that serious distortional effects due to tilting of the support are minimized.

14. A gravimeter of relatively high sensitivity to changes in the force of gravity and of relatively low sensitivity to seismic disturbances, comprising a vertically arranged coil spring formed of a coiled metal band of width at least ten times greater than thickness, means for suspending the spring at one end adapted to allow the spring to freely assume perpendicularity under the influence of gravity, a free-hanging weight attached to the other end of the spring adapted to change the length of the spring under influence of gravity and hence to cause the spring to rotate, and means for indicating the extent of rotation of the spring.

15. A gravimeter having a ribbon coil spring, a loading weight therefor, and means for supporting one end of the spring comprising at least one bimetallic element so arranged as to rotate the supported end of the spring to an extent varying with temperature, so as to minimize deflections of the spring due to temperature changes.

16. A gravimeter having a ribbon coil spring, a loading weight therefor and means for supporting the spring comprising a fixed suport and at least two bimetallic members connecting the upper end of the spring with the fixed support and so constructed and arranged as to rotate the upper end of the spring to an extent varying with temperature so as to minimize deflections of the spring due to temperature changes.

ARCHER HOYT.

CERTIFICATE OF CORRECTION.

Patent No. 2,131,737.　　　　　　　　　　　　　　October 4, 1938.

ARCHER HOYT.

It is hereby certified that error appears in the printed specification of the above numbered patent requiring correction as follows: Page 4, first column, line 74, before the word "either" insert in; page 7, second column, line 66, claim 12, for "asume" read assume; line 71, same claim, for "suport" read support; page 8, first column, line 11, claim 13, for "serious" read spurious; and that the said Letters Patent should be read with this correction therein that the same may conform to the record of the case in the Patent Office.

Signed and sealed this 15th day of November, A. D. 1938.

Henry Van Arsdale (Seal)　　　　　　　　　　　　　　　　Acting Commissioner of Patents.

pended on the spring so that upon change of weight of the mass the spring tends to rotate, a fixed support, and a gimbal hanger for the spring having a member attached to the spring and four spaced flexible filaments connecting said member with the fixed support and so constructed and arranged as to allow the spring and weight to freely assume vertical position in spite of tilt of the support, while opposing twisting of the upper part of the spring with respect to the support, so that serious distortional effects due to tilting of the support are minimized.

14. A gravimeter of relatively high sensitivity to changes in the force of gravity and of relatively low sensitivity to seismic disturbances, comprising a vertically arranged coil spring formed of a coiled metal band of width at least ten times greater than thickness, means for suspending the spring at one end adapted to allow the spring to freely assume perpendicularity under the influence of gravity, a free-hanging weight attached to the other end of the spring adapted to change the length of the spring under influence of gravity and hence to cause the spring to rotate, and means for indicating the extent of rotation of the spring.

15. A gravimeter having a ribbon coil spring, a loading weight therefor, and means for supporting one end of the spring comprising at least one bimetallic element so arranged as to rotate the supported end of the spring to an extent varying with temperature, so as to minimize deflections of the spring due to temperature changes.

16. A gravimeter having a ribbon coil spring, a loading weight therefor and means for supporting the spring comprising a fixed suport and at least two bimetallic members connecting the upper end of the spring with the fixed support and so constructed and arranged as to rotate the upper end of the spring to an extent varying with temperature so as to minimize deflections of the spring due to temperature changes.

ARCHER HOYT.

CERTIFICATE OF CORRECTION.

Patent No. 2,131,737.    October 4, 1938.

ARCHER HOYT.

It is hereby certified that error appears in the printed specification of the above numbered patent requiring correction as follows: Page 4, first column, line 74, before the word "either" insert in; page 7, second column, line 66, claim 12, for "asume" read assume; line 71, same claim, for "suport" read support; page 8, first column, line 11, claim 13, for "serious" read spurious; and that the said Letters Patent should be read with this correction therein that the same may conform to the record of the case in the Patent Office.

Signed and sealed this 15th day of November, A. D. 1938.

Henry Van Arsdale (Seal)    Acting Commissioner of Patents.